Dec. 25, 1934.  J. DE LA CIERVA  1,985,819
SUSTAINING ROTOR FOR AIRCRAFT AND METHOD OF MAKING SAME
Filed July 15, 1932   3 Sheets-Sheet 1

INVENTOR
Juan de la Cierva
BY
Symmestvedt + Lechner
ATTORNEYS

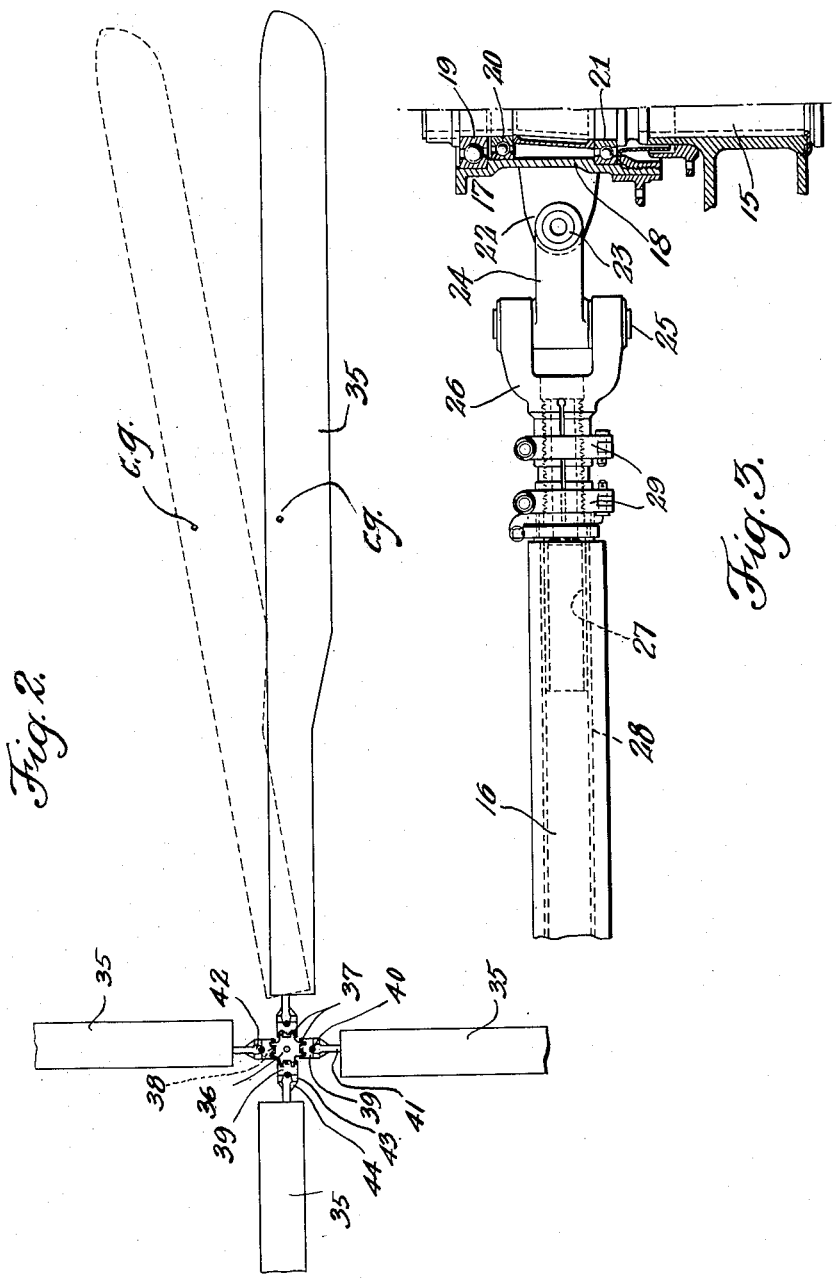

Dec. 25, 1934.   J. DE LA CIERVA   1,985,819
SUSTAINING ROTOR FOR AIRCRAFT AND METHOD OF MAKING SAME
Filed July 15, 1932   3 Sheets-Sheet 3

INVENTOR
BY *Juan de la Cierva*
*Synnestvedt + Lechner*
ATTORNEYS

Patented Dec. 25, 1934

1,985,819

UNITED STATES PATENT OFFICE 1,985,819

SUSTAINING ROTOR FOR AIRCRAFT AND METHOD OF MAKING SAME

Juan de la Cierva, Madrid, Spain, assignor to Autogiro Company of America, Philadelphia, Pa., a corporation of Delaware Application July 15, 1932, Serial No. 622,635

12 Claims. (Cl. 244—19.2)

This invention relates to sustaining rotors for aircraft and methods of making same, and especially to the type of rotors which include a plurality of sustaining blades having a mounting structure providing for rotation of the set about a common axis as well as for blade swinging or oscillative blade movements with respect to said axis.

Examples of aircraft of this general type are disclosed in my Patent No. 1,590,497, issued June 29th, 1926 and also in my Patent No. 1,859,584, issued May 24th, 1932, and the present invention is concerned particularly with the improvement of the rotor operation and construction as will appear more fully hereinafter in the following discussion, making reference to the accompanying drawings in which—

Figure 2 is a somewhat diagrammatic and fragmentary top view of a somewhat modified sustaining rotor construction also embodying improvements of the present invention;

Figure 1:
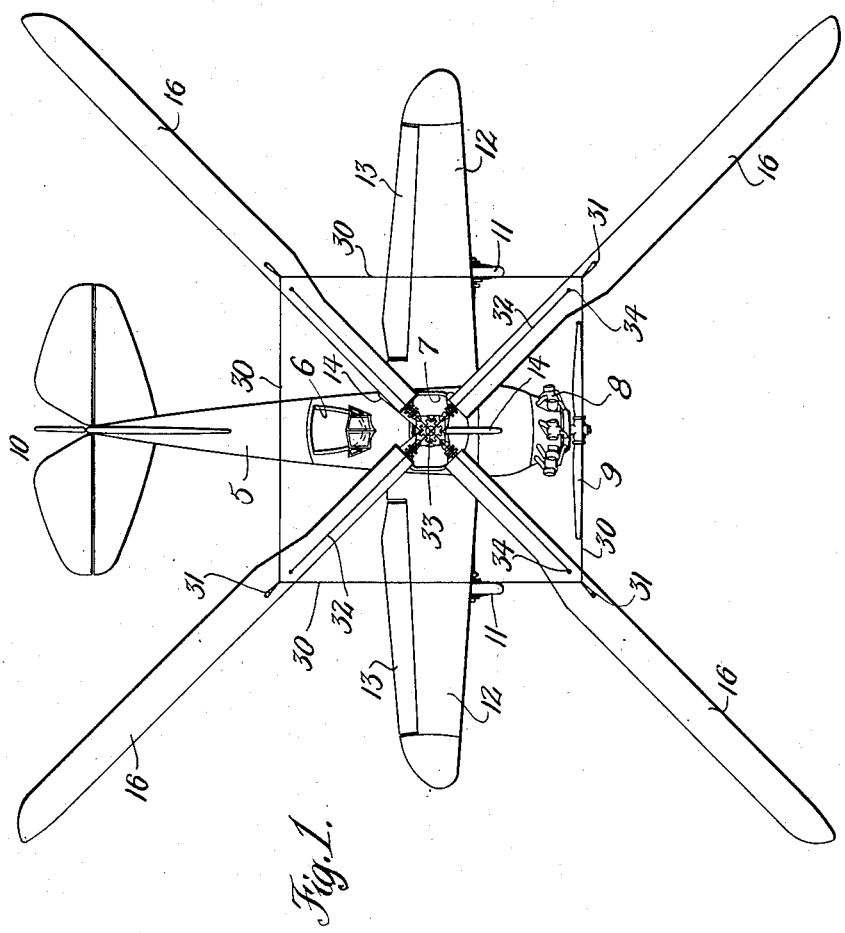
Figure 1 is a top plan view of an aircraft of this general type embodying the improvements of the present invention.
Figure 4:
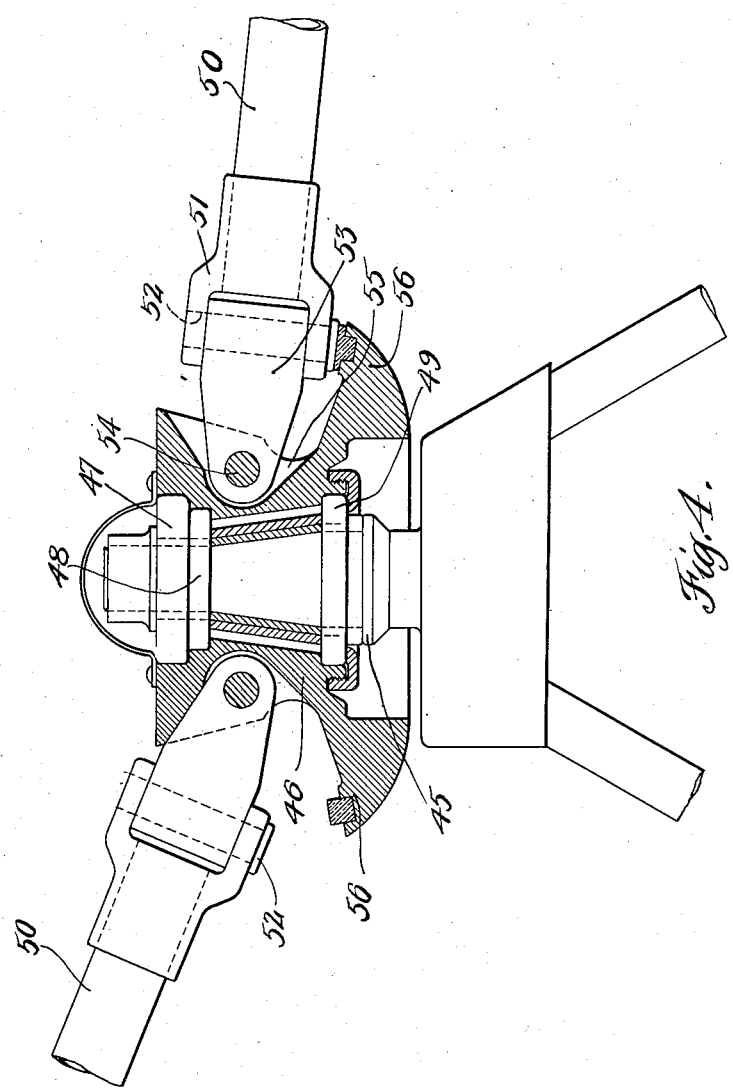

Figure 3 is an enlarged side elevational view of the hub end of one of the rotor blades of Figure 1, illustrating a portion of the mounting structure therefor in vertical section; and Figure 4 is a vertical sectional view of a rotor hub or mounting structure illustrating certain blade supporting means which may advantageously be employed in combination with other features of the present invention, this view including portions of sustaining blades secured to the hub structure.

Figure 1 illustrates an aircraft embodying the present invention, this particular craft including a body or fuselage 5, having one or more cockpits such as indicated at 6 and 7 for pilot and passengers. The craft is also provided with forward propelling means including an engine 8 and a propeller 9 mounted at the forward end of the fuselage 5. At the rear end of the fuselage an empennage 10 is arranged, the same having substantially the usual stabilizer and control surfaces. Suitable landing gear, including wheels 11, is also included in the general construction of the craft, and a pair of relatively small fixed wing members 12 may be disposed at the sides of the craft. Lateral control or aileron surfaces 13 are shown as being carried on the wing sections 12.

The sustaining rotor construction, in general arrangement and characteristics, is similar to that heretofore employed in aircraft of this general type, for example, as disclosed in the issued patents above referred to.

By reference to Figures 1 and 3 it will be seen that the rotor system is supported above the body of the craft as by means of a pylon including legs 14 which serve to mount an axis member 15 about which the sustaining blades 16 are mounted for rotation as by means of a hub structure indicated in general, in Figure 3, by the reference numeral 17. The hub structure includes what might be termed the hub member proper 18, mounted for free rotation with respect to the axis member 15 by means of ball bearings 19, 20, and 21, these bearings being arranged to receive both radial and thrust forces.

The blades 16, preferably each individually, are articulated or pivoted to sets of lugs or ears 22 on the hub member 18. The pivot parts associated with these lugs include pivot pins 23 which are substantially horizontally disposed, and cooperating pivot or joint parts 24 which are formed at their outer ends with apertures adapted to receive substantially vertically disposed pivot pins 25. The forked members 26 which are mounted at the roots of the blades are pivotally associated with the pins 25 in such manner as to provide for freedom of swinging or oscillative movement of the blades within the general path of rotative travel thereof. Additionally, if desired, means may be provided for adjusting or changing the angle of incidence of the individual blades, such means including a part 27 secured to the blade spar 28 and relatively rotatable with respect to the member 26 substantially about the longitudinal axis of the blade. Clamping devices such as indicated at 29 may be employed for securing the part 26 and the blade 16 in any adjusted relative position. The form of incidence adjustment just referred to is not a part of the present invention per se, but is described and claimed in the copending application of Harold F. Pitcairn, Serial Number 552,298, filed July 22, 1931; issued October 23, 1934 as Patent No. 1,977,834.

Still further, the blades may be provided with means for yieldingly resisting at least certain of the movements thereof on their individual pivot axes. As illustrated in Figure 1, this means may take the form of blade interconnecting cables 30 secured to non-rebounding damping devices, portions of which are indicated at 31. Such blade interconnections and devices for restricting individual blade movements are described herein in order to bring out a certain novel cooperative relation existing between the use of such devices and other features of the present invention, although the non-rebounding damping devices, such as those referred to just above, are separately disclosed and claimed in my copending application Serial Number 416,356, filed December 26, 1929; issued January 17th, 1933 as Patent No. 1,894,673.

If desired, the blades may be supported when at rest or inactive, in order to prevent them from fouling on any other part of the craft, by means of droop cables 32 which are connected to an upward extension of the rotor mounting structure as indicated at 33 in Figure 1. These droop cables, of course, extend from the member 33 outwardly a suitable distance to points of attachment on the blades, such as indicated at 34.

At this point it should be observed that during normal flight of aircraft of this general type, the rotor system as a whole is driven or actuated by virtue of the relative air-flow, from which action the sustension or lift of the rotor results. Furthermore, during normal forward flight, the differences in the speed of relative air-flow on the advancing and retreating sides of the rotor cause the blades to move or swing on their pivot pins 23 and 25, such pivotal or swinging movements serving to balance irregularities in lift and other forces which would otherwise be effective upon the blades on the advancing and retreating sides. The individual blade articulations, therefore, provide for freedom of movement of the blades with respect to each other under the influence of varying aerodynamical and other forces to which they are subjected, such, for example, as inertia, lift, drag, and anti-drag forces. In other words, they are free to oscillate on their pivots.

Heretofore, certain irregularities or roughness in the rotor operation as a whole have occurred, apparently as a result of the building up of oscillations of the individual blades on their pivots. The progressive magnification of any regular pendulum-like swinging of a blade of the rotor is discordant with the normally irregular swinging of the blade which should be free to occur under the irregular flight forces encountered, and such an undesired regular swinging of a blade or blades might even come into direct coincidence with the speed of rotation of the rotor system as a whole, which would produce very considerable roughness.

The present invention is particularly concerned with the disposition of the individual blade articulations or pivots in such manner as to reduce to a minimum, roughness and irregularities in operation. It will be apparent, of course, that in a rotor system of given characteristics, variations in the location of the substantially vertically disposed pivot pins, for example, from the common axis, will change or alter said natural period of swinging which the individual blades tend to assume as to their movements on their pivots.

Tests have shown that by displacing or offsetting the vertical pivot from the centre of rotation, the effective action of centrifugal force tending to return a displaced blade to mid-position is increased, and that, by choosing a point for the pivot sufficiently offset from the axis, the swinging or pivotal oscillation of the blade may be made such that the building up of an undesired regular oscillation is eliminated; it being again pointed out that resonant or synchronous oscillations are detrimental to smooth rotor operation because they interfere with the normal swinging actuation of the blade by flight forces, which is a variable swinging in each revolution, and also varies as between different styles of flight, for example forward flight and vertical descent.

Tests further indicate that the pivot pins should be so disposed with respect to the common axis of rotation as to produce a tendency for the individual blade to oscillate on one or more of its pivots at a rate which approximates a harmonic relation to the speed of rotation of the rotor system, as it seems that this affords an increase in the smoothness of operation of the rotor as a whole. This, of course, is highly important in a relatively large rotating structure for the reason that any roughness or periodic building up of undesirable blade oscillations subjects the blades themselves, as well as their mounting structure, to irregular forces, sometimes resulting in "weaving" or oscillation of the entire rotor unit with respect to the fuselage.

In a preferred arrangement of the present invention, as illustrated in Figures 1 and 3, the vertically disposed blade pivot pins are so offset or spaced outwardly from the common axis of rotation as to provide a harmonic relation between the rotor speed and the tendency of the individual blade to swing on its pivot, such that one of such actions coincides with an even harmonic of the other. It is to be understood, however, that while the best results seem to be obtained with this specific harmonic relation, similar effects apparently may be produced by the disposition of vertical pivots approximately at other harmonic points such that the speed of rotation of the rotor system as a whole bears some harmonic relation to the articulative blade movements.

The reason why this avoids the building up of unwanted resonance in the rotor appears to be as follows: If the period of rotation is substantially the same as a harmonic (preferably the first even harmonic) of the inherent period of pivotal blade oscillation, the basic periods themselves will substantially alternately be of oppositely acting, i. e., damping, effect. This appears to avoid resonance between the basic period of rotation of the rotor and the basic period of oscillation of a blade, and in consequence also between the blades themselves, which in flight are normally swingingly actuated asymetrically by flight forces.

In addition to the foregoing, it will be understood that the disposition of the vertical pins in the manner specified above should be such as to bring about the desired harmonic inter-relation of rotational and individual blade movement tendencies at substantially normal rotor speed under flight conditions. It will be found that the location of the pivot pins will vary, in bringing about the harmonic relation, in accordance with the weight, length, center of gravity (c. g. in Figure 2), speed of rotation and other characteristics of the blades as well as of the craft as a whole. However, with a craft of substantially given proportions, weight and the like, a well designed rotor system, constructed in accordance with the present invention, will substantially maintain the desirable relative speeds of rotation and individual blade movement throughout substantially all normal flying conditions, especially when proportioned and arranged with respect to the supplemental fixed wings in the manner set forth in my copending application Serial Number 500,064, filed December 4th, 1930, (issued February 20th, 1934 as Patent No. 1,947,901) by which the rotational speed is kept substantially constant.

As suggested in Figure 1 of the drawings, the rotor system embodying the characteristics above described may also be provided with means for yieldingly resisting or damping at least certain individual blade movements on their pivot axes. This means, in accordance with the showing of Figure 1, takes the form of blade inter-connecting cables which are associated with damping devices which are non-reacting or "non-rebounding" in character. These devices, furthermore, may be so constructed as to operate only after the blades have been deflected a predetermined number of degrees from the radial position, or, as brought out more clearly in my co-pending application Serial Number 416,356 referred to above, may be designed to resist or damp all blade deflections or movements. In either case, I have found that with the various characteristics of the rotor and craft, including the reaction of the damping device properly designed, the disposition of the vertical pivot pins in the manner specified above will produce the desired harmonic relation between the speed of rotation of the system as a whole and the speed of articulative blade movement. It might be noted that this harmonic condition may equally well be provided in a system which does not include any damping or blade movement resisting means, but that the pivot location will be varied accordingly.

Referring now to Figure 2, in which a modified rotor system is somewhat diagrammatically illustrated, a set of rotor blades is indicated by the reference numeral 35, three of the blades being broken off near the hub in this view. The mounting structure for the blades 35 in this instance is indicated at 36, the same being provided with pairs of lugs or ears 37 adapted to receive horizontally disposed pivot pins 38. The joint parts 39 cooperate with the pins 38 and also with the vertically extended pins 40 to provide for movement of the blades with respect to each other substantially within their general path of travel. The blade stubs or shanks 41, of course, are provided with lugs or fork-ends 42 which are apertured to receive pins 40. In this construction also the vertically disposed pins are spaced from the common axis of rotation in such manner as to provide the harmonic inter-relation of blade and rotor movements.

The construction of Figure 2, however, differs from that of Figures 1 and 3 by the inclusion of a somewhat modified type of means for resisting individual blade movements. Here, this means takes the form of rubber or resilient blocks 43 which are interposed between ears 44 formed on the blade shanks 41 and the joint parts 39. These blocks may be constructed so as to come into action only after a given angular displacement of the blades, or, as illustrated in Figure 2, to be operative for all angular blade displacements. While I prefer to employ damping devices of the non-rebounding type wherever it is desired to include means for resisting individual blade movements, a rotor system including resilient devices such as those shown in Figure 2 may also be constructed, as to the pivot location, in such manner that the desired relation between the rotor and blade movements is afforded.

In Figure 4, I have illustrated a rotor axis member 45 about which the hub member 46 is mounted, with bearings 47, 48, and 49 interposed therebetween. This structure includes a set of sustaining blades, the root ends of two of which are indicated at 50. Each one of these blades is provided with a forked socket 51 associated with a vertically disposed pivot pin 52 extending through an aperture in the joint part 53. The joint part 53 in turn is articulated, by means of horizontally disposed pins 54 to the lugs or ears 55 of the hub 46.

This hub structure includes abutment or stop means which may conveniently take the form of an annular shoulder 56 at the lower end thereof which is arranged to cooperate with the vertically disposed pivot pins 52 in order to support the blades when they are inactive or at rest. This form of blade droop support is advantageous for various reasons more clearly brought out in my copending application, Serial No. 532,604, filed April 24th, 1931; issued November 13th, 1934 as Patent No. 1,980,169. By way of example, it might be mentioned that this type of blade support is advantageous over the supporting cable type of Figure 1 as it results in a more efficient rotor structure from the standpoint of parasite drag.

In considering the advantage of employing the blade supporting mechanism of Figure 4 in combination with a rotor constructed in accordance with the present invention, it should be borne in mind that it is desirable to arrange the blade supports in such manner as to contact or cooperate with the blades themselves at points not radially outwardly beyond the vertically disposed pivot pins. In view of the fact that according to the present invention the vertically arranged pivot pins are ordinarily spaced somewhat farther from the center of rotation than has been customary heretofore, the blade supports may be arranged a considerable distance outwardly from the point of horizontal articulation. This provides a more sturdy blade support as it increases the leverage thereof. That is, it permits the disposition of the abutments at a greater distance outwardly from the horizontally disposed pivot pins on which the blades swing downwardly when at rest.

In summary, it will be seen that the invention broadly contemplates a rotor blade pivot bearing so co-operatively related to the rotor axis and to the weight and center of gravity of the wing as to provide a relationship between the rotor speed of rotation and the inherent blade oscillation rate or tendency to swing on its pivot that any resonant vibrations in the rotor automatically tend to be damped out when the rotor is turned at normal speed under aerodynamic action.

According to the foregoing, the present invention effects a material improvement in sustaining rotor operation by reducing roughness or the like to a minimum. In addition, the present invention provides for the use of a very sturdy blade droop support by the disposition of the vertically disposed pivot pins at a relatively greater distance than usual from the center of rotation of the system.

What I claim is:—

1. For rotative-winged aircraft, an autorotative sustaining rotor comprising a hub structure mounted for normally free rotation about an upright axis, a plurality of aeroform wings secured to said hub structure in position to be normally autorotationally turned about the axis of the hub under the influence of relative air-flow in flight, and flexible mounting or pivot mechanism for said wings including, for a wing, a pivotal axis providing for swinging movements of the wing in addition to its normal autorotative movement whereby to accommodate variable forces acting on the wing in flight, said wing having a mass distribution which locates its center of gravity in a zone within the middle third of the total wing length, and said pivot axis being appreciably offset radially from the axis of the hub a distance such that said pivot is located at a point which produces magnification of the restoring moment of the centrifugal force, acting through said center of gravity and said hub axis when the wing is displaced from its normal mid position in flight, to that degree which produces an inherent pendular action of the wing on its pivot which is out of direct resonance with the R. P. M. of the rotor in its normal autorotational range of speeds.

2. For rotative-winged aircraft, a sustaining rotor mounted so that it may be normally rotated by relative air-flow in flight and including a hub rotatable about an upright axis, a substantially-elongated sustaining wing mounted thereon in position to rotate about the axis thereof, said rotor having means providing for individual wing-swinging movements or oscillations about an axis other than the rotational axis, said wing having its center of gravity at such distance from the rotational axis as to normally substantially limit the deviations of the wing, from its normal mid-position, under the action of flight forces, and said wing axis being offset, longitudinally of the wing, from the rotational axis to such a proportion of the distance of the wing's center of gravity from the rotational axis that the rotational period of the rotor and the basic wing-swinging period, throughout the normal range of rotor speeds in flight, are out of basic resonance, whereby an abnormal or excessive deviation, particularly of a periodic or synchronous nature, is avoided.

3. For rotative-winged aircraft, a sustaining rotor mounted so that it may be normally rotated by relative air-flow in flight and including a hub rotatable about an upright axis, a plurality of substantially-elongated sustaining wings mounted thereon in position to rotate about the common axis thereof, said rotor having means providing for individual wing-swinging movements about individual axes other than the rotational axis, whereby to accommodate irregular flight-induced forces, each wing having its center of gravity at such distance from the rotational axis as to normally be acted upon by the centrifugal force in flight to limit the swinging of the wing to within a certain restricted normal range, and the individual axis of each wing being offset or radially removed a distance from the common rotational axis to a point such that the rotational period of the rotor and the basic swinging or oscillation period of the several wings on their individual pivots, in flight, are out of basic resonance as are also the flight-induced oscillations of the several wings themselves.

4. In the manufacture of autorotative sustaining rotors having wings individually pivoted to a common hub, the method which includes so proportioning the distances between the hub axis and a pivot axis for a wing of a given weight and between the hub axis and the center of gravity of said wing, that the oscillation period of the wing on its pivot, as a virtual pendulum during rotation in flight bears such a frequency relation to the normal range of rotor frequencies in R. P. M. that the external forces acting on the wing in flight tend to damp out rather than to augment any periodic oscillation of the wing on its pivot.

5. For rotative-winged aircraft, an autorotative sustaining rotor comprising a hub structure mounted for normally free rotation about an upright axis, a plurality of aeroform wings secured to said hub structure in position to be normally autorotationally turned about the axis of the hub under the influence of relative air-flow in flight, and flexible mounting or pivot mechanism for said wings including, for a wing, a pivotal axis positioned to provide for swinging movements of the wing in the directions of drag and acceleration in addition to its normal autorotative movement, whereby to accommodate variable forces acting on the wing in flight, said wing having a mass distribution which locates its center of gravity in a zone within the middle third of the total wing length, and said pivot axis being appreciably offset radially from the axis of the hub a distance such that said pivot is located at a point which produces magnification of the restoring moment of the centrifugal force, acting through said center of gravity and said hub axis when the wing is displaced from its normal mid position in flight, to that degree which produces an inherent pendular action of the wing on its said pivot which is out of direct resonance with the R. P. M. of the rotor in its normal autorotational range of speeds.

6. For rotative-winged aircraft, an autorotative sustaining rotor comprising a hub structure mounted for normally free rotation about an upright axis, a plurality of aeroform wings secured to said hub structure in position to be normally autorotationally turned about the axis of the hub under the influence of relative air-flow in flight, and flexible mounting or pivot mechanism for said wings including, for a wing, a pivotal axis providing for swinging movements of the wing in addition to its normal autorotative movement whereby to accommodate variable forces acting on the wing in flight, and a device yieldingly resisting wing-swinging movements, said wing having a mass distribution which locates its center of gravity in a zone within the middle third of the total wing length, and said pivot axis being appreciably offset radially from the axis of the hub a distance such that said pivot is located at a point which produces magnification of the restoring moment of the centrifugal force, acting through said center of gravity and said hub axis when the wing is displaced from its normal mid position in flight, to that degree which produces, in conjunction with the action of said yielding resistance device, an inherent pendular action of the wing on its pivot which is out of direct resonance with the R. P. M. of the rotor in its normal autorotational range of speeds.

7. For rotative-winged aircraft, a sustaining rotor mounted so that it may be normally rotated by relative air-flow in flight and including a hub rotatable about an upright axis, a substantially-elongated sustaining wing mounted thereon in position to rotate about the axis thereof, said rotor having means providing for individual irregular wing-swinging movements or oscillations, under the influence of variable flight forces, about an axis other than the rotational axis, said wing having its center of gravity at such distance from the rotational axis as to normally substantially limit the deviations of the wing, from its normal mid position, under the action of said variable flight forces, and said wing axis being offset, longitudinally of the wing, from the rotational axis to such a proportion of the distance of the wing's center of gravity from the rotational axis that the rotational period of the rotor and the basic wing-swinging period, throughout the normal range of rotor speeds in flight, are out of basic resonance, whereby an abnormal or excessive deviation, particularly of a periodic or synchronous nature, is avoided, so that the wing is free to swing irregularly under such variable flight forces.

8. For rotative-winged aircraft, a sustaining rotor mounted so that it may be normally rotated by relative air-flow in flight and including a hub rotatable about an upright axis, a substantially-elongated sustaining wing mounted thereon in position to rotate about the axis thereof, said rotor having means providing for individual wing-swinging movements or oscillations about an axis other than the rotational axis, said wing having its center of gravity at such distance from the rotational axis as to normally substantially limit the deviations of the wing, from its normal mid position, under the action of flight forces, and said wing axis being offset, longitudinally of the wing, from the rotational axis to such a proportion of the distance of the wing's center of gravity from the rotational axis that the rotational period of the rotor and the basic wing-swinging period, throughout the normal range of rotor speeds in flight, are out of basic resonance but are harmonically related, whereby an abnormal or excessive deviation of the wing, particularly of a periodic or synchronous nature, is avoided.

9. For rotative-winged aircraft, a sustaining rotor mounted so that it may be normally rotated by relative air-flow in flight and including a hub rotatable about an upright axis, a substantially-elongated sustaining wing mounted thereon in position to rotate about the axis thereof, said rotor having means providing for individual wing-swinging movements or oscillations about an axis other than the rotational axis, said wing having its center of gravity at such distance from the rotational axis as to normally substantially limit the deviations of the wing, from its normal mid position, under the action of flight forces, and said wing axis being offset, longitudinally of the wing, from the rotational axis to such a proportion of the distance of the wing's center of gravity from the rotational axis that the rotational period of the rotor and the basic wing-swinging period, throughout the normal range of rotor speeds in flight, are out of basic resonance, the normal rotational period of the rotor being a harmonic of the inherent swinging period of the wing considered as an aerodynamically-operating pendulum, whereby an abnormal or excessive deviation of the wing, particularly of a periodic or synchronous nature, is avoided.

10. For rotative-winged aircraft, a sustaining rotor mounted so that it may be normally rotated by relative air-flow in flight and including a hub rotatable about an upright axis, a substantially-elongated sustaining wing mounted thereon in position to rotate about the axis thereof, said rotor having means providing for individual wing-swinging movements or oscillations about an axis other than the rotational axis, said wing having its center of gravity at such distance from the rotational axis as to normally substantially limit the deviations of the wing, from its normal mid position, under the action of flight forces, and said wing axis being offset, longitudinally of the wing, from the rotational axis to such a proportion of the distance of the wing's center of gravity from the rotational axis that the rotational period of the rotor and the basic wing-swinging period, throughout the normal range of rotor speeds in flight, are out of basic resonance, the extent of said offset being further characterized in that the normal rotational period of the rotor approximates the first even harmonic of the inherent pivotal wing oscillation period, whereby an abnormal or excessive deviation of the wing, particularly of a periodic or synchronous nature, is avoided or damped out.

11. For rotative-winged aircraft, a sustaining rotor mounted so that it may be normally rotated by relative air-flow in flight and including a hub rotatable about an upright axis, a substantially-elongated sustaining wing mounted thereon in position to rotate about the axis thereof, said rotor having means providing for individual wing-swinging movements or oscillations back and forth in the general plane of rotation about an axis other than the rotational axis, said wing having its center of gravity at such distance from the rotational axis as to normally substantially limit the deviations of the wing, from its normal mid position, under the action of flight forces, and said wing axis being positioned to intersect at a substantial angle the general plane of rotation of the wing and further being offset, longitudinally of the wing, from the rotational axis to such a proportion of the distance of the wing's center of gravity from the rotational axis that the rotational period of the rotor and the basic wing-swinging period in said general plane, throughout the normal range of rotor speeds in flight, are out of basic resonance, the normal rotational period of the rotor approximating a harmonic of the inherent period of wing-swinging within the general plane of rotation, whereby an abnormal or excessive deviation of the wing, particularly of a periodic or synchronous nature, is avoided.

12. For rotative-winged aircraft, an autorotative sustaining rotor comprising a hub structure mounted for normally free rotation about an upright axis, a plurality of aeroform wings secured to said hub structure in position to be normally autorotationally turned about the axis of the hub under the influence of relative air-flow in flight, and flexible mounting or pivot mechanism for said wings including, for each wing, a substantially horizontal pivot axis approximately at right angles to the longitudinal axis of the wing and positioned close to the axis of rotation of the rotor, and a secondary pivotal axis providing for swinging movements of the wing in the general plane of rotation in addition to its normal autorotative movement whereby to accommodate variable forces acting on the wing in flight, said wing having a mass distribution which locates its center of gravity in a zone within the middle third of the total wing length, and said secondary pivot axis being appreciably offset radially from the axis of the hub a distance such that said pivot is located at a point which produces magnification of the restoring moment of the centrifugal force, acting through said center of gravity and said hub axis when the wing is displaced about its secondary pivot from its normal mid position in flight, to that degree which produces an inherent pendular action of the wing on its said secondary pivot which is out of direct resonance with the R. P. M. of the rotor in its normal autorotational range of speeds.

JUAN DE LA CIERVA.